United States Patent
Correia et al.

(10) Patent No.: US 10,480,828 B2
(45) Date of Patent: Nov. 19, 2019

(54) FLOATING MODULE FOR MODULAR SOLAR PANEL PLATFORMS

(71) Applicant: SOLARISFLOAT, LDA, Matosinhos (PT)

(72) Inventors: Nuno Correia, Oporto (PT); Carla Gomes, Oporto (PT); Ricardo Pinto, Oporto (PT); Luis Pina, Oporto (PT); Nuno Moita, Oporto (PT); Jorge Teixeira Da Silva, Oporto (PT)

(73) Assignee: SOLARISFLOAT, LDA, Matosinhos (PT)

( * ) Notice: Subject to any disclaimer, the term of this patent is extended or adjusted under 35 U.S.C. 154(b) by 0 days.

(21) Appl. No.: 16/324,613

(22) PCT Filed: Sep. 1, 2017

(86) PCT No.: PCT/IB2017/055278
§ 371 (c)(1),
(2) Date: Feb. 11, 2019

(87) PCT Pub. No.: WO2018/055471
PCT Pub. Date: Mar. 29, 2018

(65) Prior Publication Data
US 2019/0219305 A1 Jul. 18, 2019

(30) Foreign Application Priority Data
Sep. 26, 2016 (PT) .......................... 109636

(51) Int. Cl.
*B63B 35/38* (2006.01)
*F24S 20/70* (2018.01)
(Continued)

(52) U.S. Cl.
CPC .............. *F24S 20/70* (2018.05); *B63B 35/38* (2013.01); *F24S 25/11* (2018.05); *F24S 25/65* (2018.05); *B63B 2035/4453* (2013.01)

(58) Field of Classification Search
CPC .. B63B 35/38; B63B 2035/4453; F24S 25/11; F24S 25/65; F24S 20/70
See application file for complete search history.

(56) References Cited

U.S. PATENT DOCUMENTS

| | | | | |
|---|---|---|---|---|
| 2008/0264363 A1* | 10/2008 | Heusser | .............. | F15B 11/0445 123/90.12 |
| 2012/0091709 A1* | 4/2012 | Hobdy | .................... | F03B 13/20 290/42 |

(Continued)

FOREIGN PATENT DOCUMENTS

| EP | 2549551 A1 | 1/2013 |
|---|---|---|
| FR | 3014830 A1 | 1/2013 |

(Continued)

OTHER PUBLICATIONS

International Search Report and Written Opinion for Corresponding International Application No. PCT/IB2017/055278 (9 Pages)(dated Jan. 4, 2018).

*Primary Examiner* — Stephen P Avila
(74) *Attorney, Agent, or Firm* — Lucas & Mercanti, LLP

(57) ABSTRACT

A floating module for modular solar panel platforms having two separate components mounted, a structural component that is a rigid component and a buoyancy component that is a flexible component allowing for a more compact and simple solution all-around. The floating module allows for a technologically more advanced floating component, easier to produce, transport and deploy than most currently available solutions.

7 Claims, 2 Drawing Sheets

(51) Int. Cl.
*F24S 25/11* (2018.01)
*F24S 25/65* (2018.01)
*B63B 35/44* (2006.01)

(56) References Cited

U.S. PATENT DOCUMENTS

2014/0174316 A1* 6/2014 Brown .................. B61H 13/00
105/1.4
2015/0162866 A1* 6/2015 Yun ........................ H02S 20/00
114/264

FOREIGN PATENT DOCUMENTS

| JP | 2007173710 | A  | 7/2007  |
| WO | 2010144955 | A1 | 12/2010 |
| WO | 2012139998 | A2 | 10/2012 |

* cited by examiner

FLOATING MODULE FOR MODULAR SOLAR PANEL PLATFORMS

CROSS-REFERENCE TO RELATED APPLICATIONS

This application is a 371 of PCT/I132017/055278 filed Sep. 1, 2017, which claims the benefit of Portuguese Patent Application No. 109636, filed Sep. 26, 2016, both applications are incorporated herein by reference.

TECHNICAL FIELD

The present application discloses a floating module for modular solar panel platforms.

BACKGROUND ART

Current energy production centrals based on photovoltaic cells, ranging different scales, are installed either on ground (onshore) or on pre-existing structures. These systems are rarely installed in water surfaces such as lakes, lagoons, ponds, dam reservoirs, rivers, among others.

The document WO 2012/139998 describes a floating structure that is itself the solar panel fixture, manufactured either by the techniques of roto-moulding or extrusion blow-moulding, thus creating a thermoplastic rigid component with encapsulated air, which can be added or removed in order to control its buoyancy. The proposed system is bulky and difficult to transport and assemble.

The document JP 2007173710 describes a floating structure for the assembly of energy production cells, that uses a thermoplastic resin foam encapsulated by two sheets of thermoplastic material, thus creating the floating component and granting the structure buoyancy.

SUMMARY

The present application describes a floating module comprising a rigid component and at least one flexible component with encapsulated air or gas, wherein the flexible component is confined inside the rigid component in a space defined by a top surface surrounded by a lateral cover, said lateral cover having structural reinforcements formed by a horizontal base rib and lateral vertical ribs, and the top surface being characterized by:
- an interior surface formed by a matrix of ribs, designed to withstand the loads and weights applied to the top surface;
- an exterior surface comprising a mounting area for assembly of a solar panel structure and a mounting area for assembly the respective through-support;
- a central passage hole to increase the structural resistance of the rigid component and to correct position of the at least one flexible component inside of the rigid component;
- at least one valve access cavity to allow the access to the interior of the respective flexible component.

In one embodiment of the floating module, the rigid component is of a thermoplastic material.

In another embodiment of the floating module, the rigid component comprises two connection ports.

Yet in another embodiment of the floating module, the flexible component comprises at least one membrane of a thermoplastic material.

Yet in another embodiment of the floating module, the flexible component comprises a valve.

Yet in another embodiment of the floating module, the assembly between the rigid component and the flexible component is performed by housing the valve of the flexible component in the valve access cavity of the rigid component through the application of a valve brake.

Yet in another embodiment of the floating module, the assembly of the solar panel structure and its through support in each respective mounting area is of a screw and nut type.

The present application also discloses a floating platform comprising at least three floating modules as described previously.

GENERAL DESCRIPTION

The technology now developed is related to a floating module, which allows for the buoyancy at surface level of a floating platform formed by the connection of at least two floating modules.

The floating module is to be installed in a group with at least three floating modules, forming a platform suitable to support a solar module capable of producing energy through a photovoltaic panel over an aquatic medium.

Due to the fluctuation and instability of the aquatic medium, the floating module is designed to withstand loads imposed either by the dynamics of the medium as well as those imposed by people and equipment necessary during system maintenance.

For that purpose, an intricate geometry assures that the mechanical stress and load is absorbed by the component without posing any issue to its integrity. Besides that, its geometry also makes the elements of the solution easily stackable, creating a compact product that is simpler to transport.

In the light of that, a floating module is comprised by a rigid component and at least one flexible component. The flexible component is filled with air or other gas, being confined inside the space defined by the rigid component.

The rigid component is responsible for the structural rigidity and integrity of the floating module and the assembled floating platform by extension, needed for the support of solar modules and people undergoing maintenance activities, when the platform is deployed in aquatic mediums.

The rigid component is produced with the use of thermoplastic processing technologies, specifically injection moulding, which enables the production of a single part with intricate geometry, lightweight and highly resistant. The rigid component has several geometric features representing structural reinforcements which are responsible for the superior resistance and mechanical behavior: the base ribs ensure the large cavity retains its shape and don't allow for the material to bend in such a way that it would deform permanently; the interior surface of the component presents a complex matrix of ribs, which are engineered to withstand the loads and weights applied to the superior surface of the floating module, ensuring a smooth and homogeneous distribution of the loads to the lateral ribs. These, in turn, transmit the load further to the base ribs, therefore making the load bearing ability of the whole component dependent on the conjunction of these features. The central passage hole allows for shafts to pass and for the correct positioning of the flexible component, while also increasing the structural resistance of the structure.

The top surface of the rigid component comprises at least one valve access cavity, to allow the access to the interior of the respective flexible component. It also comprises a mounting area promoting the contact and fixation of a solar panel structure in the rigid component and also a mounting area for the respective through-support solar panel structure; both of these assemblies are achieved with screws and nuts.

The rigid component comprises additionally two connection ports, one in each lateral surface, promoting the reunion of other floating modules—and in particular its rigid components—to form a platform.

The flexible component complements the rigid component in a way that it grants buoyancy to the element itself and to the assembled platform by extension. This is a flexible component comprised of one or more membranes of flexible material, like a thermoplastic material, which allows for air or other gases to be enclosed inside through a valve which is part of the component, granting a buoyant force strong enough to counteract the forces applied by the solar module and every other components needed for the normal operation of the platform.

The separation of the flexible and the rigid components allow for an easier and simpler maintenance. The assembly between those components is performed using a valve mounted in the flexible component and the valve access cavity installed in the rigid component. Specifically, when the valve is housed in the valve access cavity, the position of the flexible component inside of the rigid component is achieved from the application of a valve brake which holds it in place, even when deflated. The arrangement valve, valve brake and valve access cavity also allows for secure maintenance operations of the flexible component, in particularly its refill with air or gas, even during the utilization course of the platform.

The floating module is to be applied in conjunction with proper connectors to build a platform intended to support solar panel modules. The construction of a floating platform requires the use of three floating components, in order to support a solar modular structure.

BRIEF DESCRIPTION OF DRAWINGS

For easier understanding of this application, figures are attached in the annex that represent the preferred forms of implementation which nevertheless are not intended to limit the technique disclosed herein.

DESCRIPTION OF EMBODIMENTS

Figure 1:
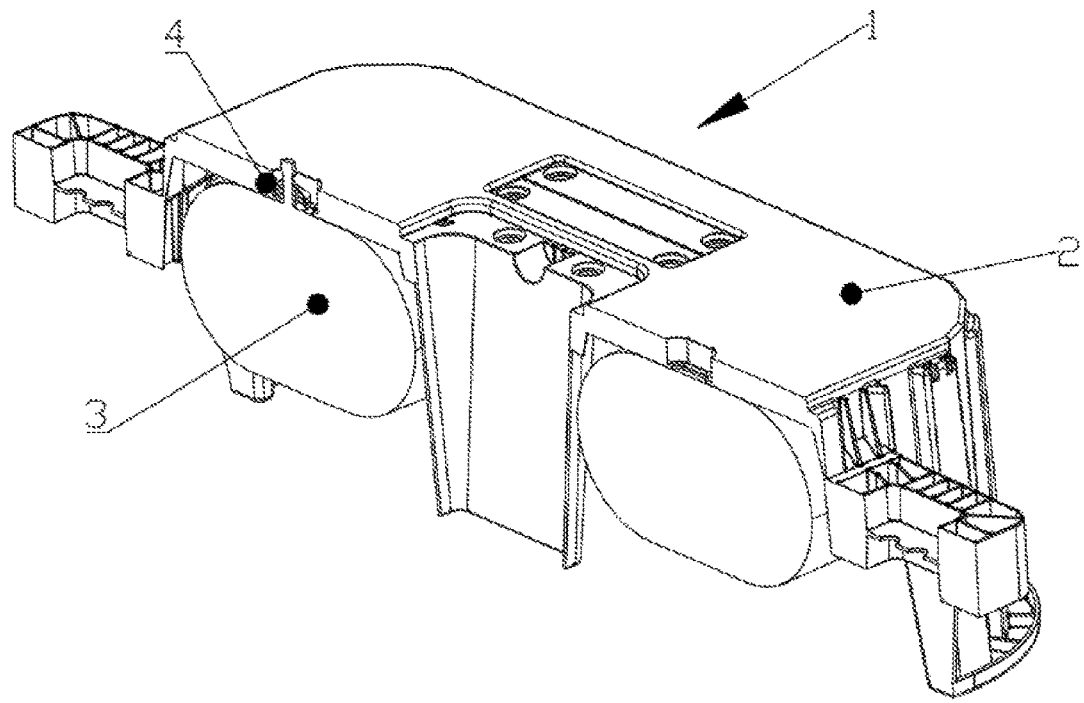
FIG. 1: Schematic representation of a floating component (1), where the reference numbers represent:
  2—Rigid component;
  3—Flexible component;
  4—Valve brake.
Figure 2:
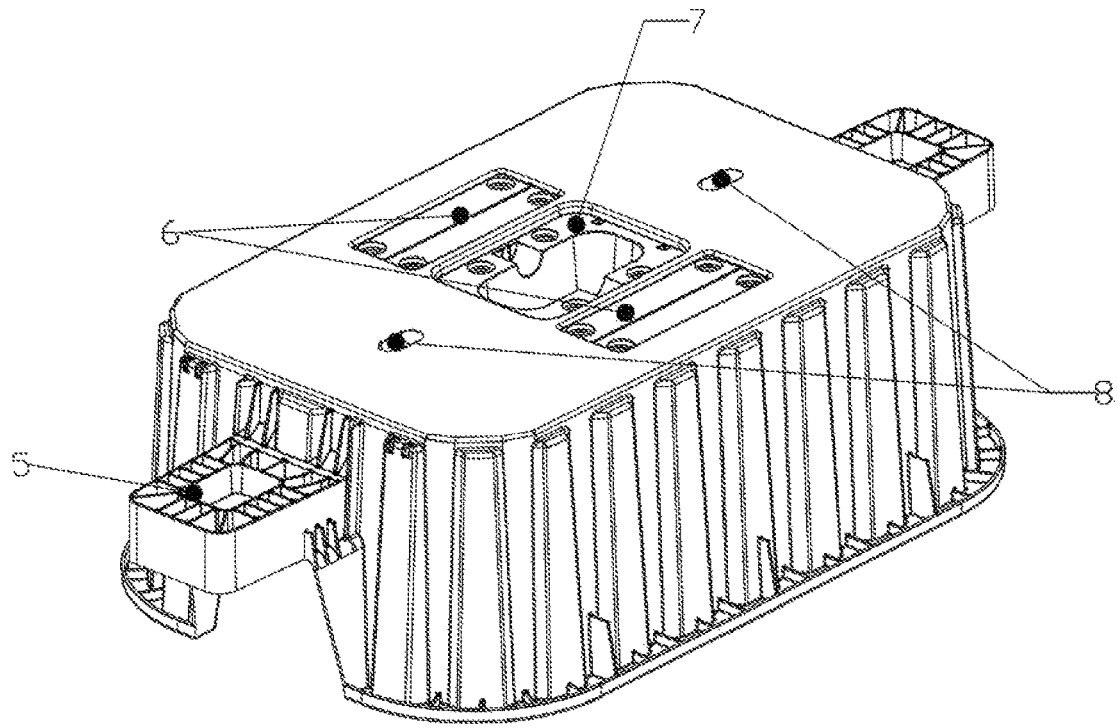
FIG. 2: Schematic representation of a rigid component (2), where the reference numbers represent:
  5—Connection port;
  6—Mounting Area for Panel Supports;
  7—Mounting Area for Through-Support;
  8—Valve Access Cavities.
Figure 3:
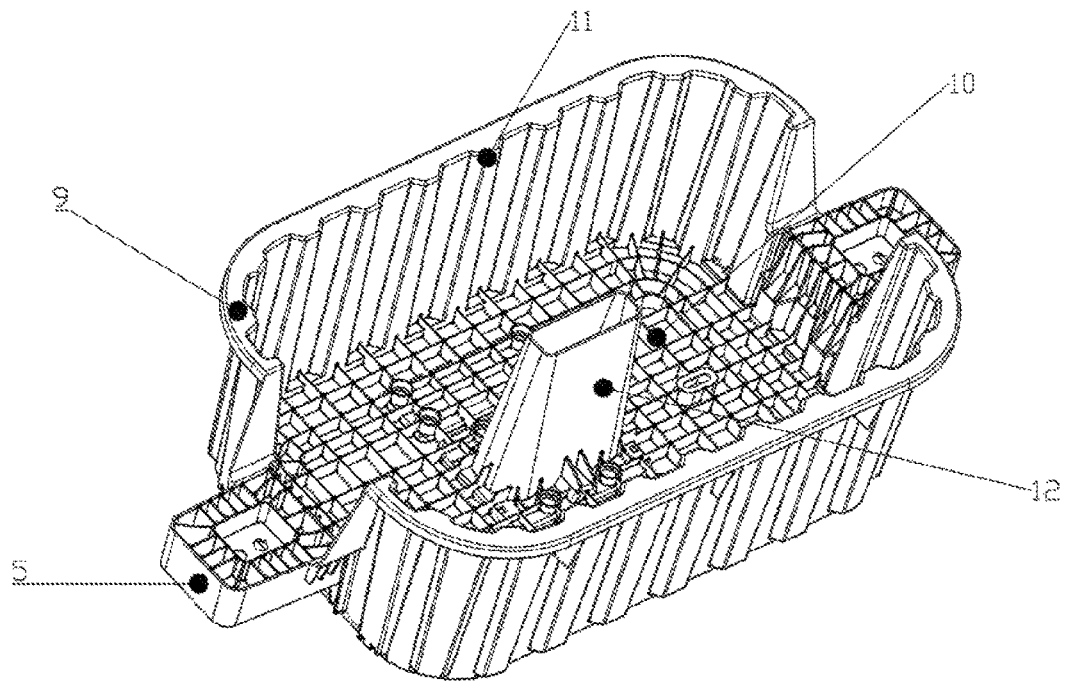
FIG. 3: Schematic representation of the inferior view of a rigid component (2), where the reference numbers represent:
  5—Connection port;
  9—Base Ribs;
  10—Rib Matrix;
  11—Lateral Ribs;
  12—Central passage hole.
Figure 4:
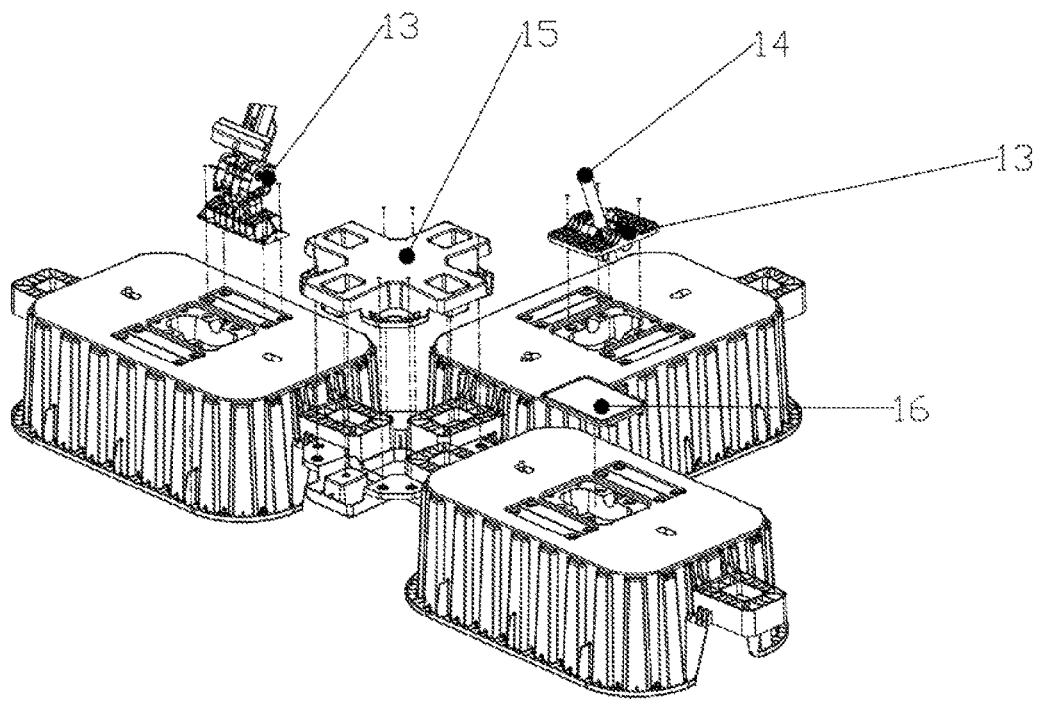
FIG. 4: Schematic representation of a functional assembly for energy production platform, where the reference numbers represent:
  13—Solar Panel Support;
  14—Shaft;
  15—Connector;
  16—Cover lid.

For easier understanding of this application, figures are attached in the annex that represent example forms of implementation, which, nevertheless, are not intended to limit the application, disclosed herein.

The present application describes a floating module (1) for modular solar panel platforms. For the purpose of this application, two separate components are mounted: a rigid component (2) and a buoyancy flexible component (3), allowing for a more compact and simple solution all-around.

The rigid component (2) has functional areas that, when properly assembled by the connection ports (5), allow for the fixation of solar panel supports in the mounting area for solar panels (6) and mounting area for through-support solar panel structure (7). Its shape, structural integrity and resistance are guaranteed by the existence of geometric features (9, 10, 11, 12) throughout its surface area.

The flexible component's (3) valve is mounted through a valve brake (4) which holds it in place, even when deflated. This assembly is accessible through the valve access cavities (8); this allows for maintenance and filling of the flexible component from the top of the rigid component, eliminating the need for disassembly of these two components.

In a particular embodiment, for full assembly of an energy production floating platform, at least three floating modules (1) are assembled by means of a connector (15) with the connection ports (5), receiving in the proper mounting areas (6, 7) solar panels supports (13) and a shaft (14) from the solar module. This allows for the deployment of a solar panel platform in water surfaces.

The invention claimed is:

1. A floating module for modular solar panel platforms comprising a rigid component and at least one flexible component with encapsulated air or gas, wherein the at least one flexible component is confined inside the rigid component in a space defined by a top surface surrounded by a lateral cover, said lateral cover having structural reinforcements formed by a horizontal base rib and lateral vertical ribs,
  wherein the top surface comprises:
    an interior surface formed by a matrix of ribs, designed to withstand the loads and weights applied to the top surface;
    an exterior surface comprising a mounting area for assembly of a solar panel structure and a mounting area for assembly said solar panel structure by means of a through-support;
    a central passage hole to increase the structural resistance of the rigid component and to correct position of the at least one flexible component inside of the rigid component;
    at least one valve access cavity to allow the access to the interior of the respective flexible component, and
    wherein the at least one flexible component and the rigid component is assembled via a valve mounted in the flexible component and the valve access cavity installed in the rigid component; said valve being housed in the valve access cavity and the position of the flexible component inside the rigid component being achieved with the application of a valve brake.

2. The floating module according to claim 1, wherein the rigid component is of a thermoplastic material.

3. The floating module according to claim 1, wherein the rigid component comprises two connection ports.

4. The floating module according to claim 1, wherein the flexible component comprises at least one membrane of a thermoplastic material.

5. The floating module according to claim 1, wherein the flexible component comprises a valve.

6. The floating module according to claim 1, wherein the assembly of the solar panel structure and its through support in each respective mounting area is of a screw and nut type.

7. Floating platform comprising at least three floating modules according to claim 1.

* * * * *